United States Patent
Jankovic et al.

(10) Patent No.: US 9,816,447 B2
(45) Date of Patent: Nov. 14, 2017

(54) METHODS AND SYSTEMS FOR SURGE CONTROL

(71) Applicant: Ford Global Technologies, LLC, Dearborn, MI (US)

(72) Inventors: Mrdjan J. Jankovic, Birmingham, MI (US); Julia Helen Buckland, Commerce Township, MI (US); Hamid-Reza Ossareh, Ann Arbor, MI (US); Charlie Teng, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 14/592,759

(22) Filed: Jan. 8, 2015

(65) Prior Publication Data

US 2016/0201584 A1 Jul. 14, 2016

(51) Int. Cl.
*F02D 41/22* (2006.01)
*F02D 41/00* (2006.01)
*F02D 41/24* (2006.01)

(52) U.S. Cl.
CPC ......... *F02D 41/0007* (2013.01); *F02D 41/22* (2013.01); *F02D 41/2422* (2013.01); *F02D 41/2464* (2013.01); *F02D 2200/501* (2013.01); *Y02T 10/144* (2013.01)

(58) Field of Classification Search
CPC ............. F02D 41/0007; F02D 41/2464; F02D 41/2422; F02D 41/22; F02D 2200/501
USPC .......................................................... 60/611
See application file for complete search history.

(56) References Cited

U.S. PATENT DOCUMENTS

| 8,642,200 | B2 | 2/2014 | Kirklin |
| 2008/0264067 | A1* | 10/2008 | Flucker ................. F01D 17/162 60/793 |
| 2009/0325010 | A1 | 12/2009 | Kirklin |
| 2012/0121376 | A1* | 5/2012 | Huis In Het Veld ........................... F04D 27/0207 415/1 |
| 2012/0328410 | A1 | 12/2012 | Narayanan et al. |
| 2013/0111901 | A1* | 5/2013 | Leone .............. F02M 35/10295 60/611 |
| 2014/0157774 | A1* | 6/2014 | McConville .......... F02B 37/164 60/611 |
| 2014/0214304 | A1* | 7/2014 | Mischler ................. F02D 41/18 701/102 |

(Continued)

OTHER PUBLICATIONS

Xiao, Baitao et al., "Methods and Systems for Real-Time Compressor Surge Line Adaptation," U.S. Appl. No. 14/563,749, filed Dec. 8, 2014, 53 pages.

(Continued)

*Primary Examiner* — Jonathan Matthias
(74) *Attorney, Agent, or Firm* — Julia Voutyras; McCoy Russell LLP

(57) ABSTRACT

Methods and systems are provided for calibrating a compressor surge line. In one example, a method may include adjusting the compressor surge line based on a vehicle speed in addition to a compressor pressure ratio. For example, at higher vehicle speeds, above a threshold vehicle speed, a less aggressive surge line calibration may be utilized in order to improve drivability while at lower vehicle speeds, below the threshold vehicle speed, a more aggressive surge line calibration may be utilized for NVH mitigation.

20 Claims, 9 Drawing Sheets

(56) References Cited

U.S. PATENT DOCUMENTS

2014/0308110 A1* 10/2014 Houst .................... F02B 37/22
 415/1
2015/0047605 A1 2/2015 Buckland et al.

OTHER PUBLICATIONS

Figurella, Neil et al., "Effect of Inlet Guide Vanes on Centrifugal Compressor Acoustics and Performance," Noise Control Engr. Journal 62 (4) Jul.-Aug. 2014, pp. 232-237.

* cited by examiner

METHODS AND SYSTEMS FOR SURGE CONTROL

FIELD

The present application relates to methods and systems for adapting a surge line calibration in engine systems configured with a continuously variable compressor recirculation valve to improve surge control.

BACKGROUND AND SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. However, compressors are prone to surge. For example, when an operator tips-out of an accelerator pedal, an engine intake throttle closes, leading to reduced forward flow through the compressor, and a potential for surge. As such, surge can lead to NVH issues such as undesirable noise from the engine intake system, in addition to causing drivability and performance concerns. For example, during hard surge, the compressor allows air to momentarily backflow through the compressor resulting in rapid, high amplitude oscillations, while during soft surge, smaller pressure oscillations are experienced.

Compressor operating points that lead to hard surge can be identified on a compressor map that plots compressor pressure ratio versus compressor flow rate. If the operating point of the compressor moves to the left of a "surge line", hard surge occurs. Thus, engine controllers aim to adjust compressor operation to avoid the hard surge region to the left of the surge line. Soft surge often occurs when the constant compressor speed lines on the compressor map have a positive slope. While soft surge is characterized by small amplitude oscillations in pressure and flow during steady-state conditions, when large enough, the soft surge oscillations can also lead to audible NVH and/or drivability concerns. Another compressor NVH concern, referred to as "tip-in whoosh", typically occurs during a tip-in.

To address either form of compressor surge, as well as tip-in whoosh, engine systems may include a compressor recirculation valve (CRV), such as a continuously variable compressor recirculation valve (CCRV) that is coupled across the compressor. One example of such a valve is shown by Narayanan et al. in patent application US20120328410. An opening of the valve may be increased in response to any indication of surge, thereby recirculating a portion of air from the compressor outlet to the compressor inlet, and rapidly decaying boost pressure. The resulting increase in compressor flow and decrease in compressor pressure ratio moves the operating point of the compressor away from the surge line. The CCRV can also be used to avoid regions on the whoosh map that lead to undesirable levels of noise during tip-in by calibrating the surge line differently.

However the inventors herein have identified potential issues that may arise during surge line calibration. Specifically, surge lines that are calibrated to reduce soft surge and tip-in whoosh may result in torque loss. As an example, a surge line that is calibrated to avoid the soft surge region and/or the tip-in whoosh region may result in a compressor operating point where there is insufficient turbine power available to create boost. As such, this may result in torque loss. For example, if a CCRV is opened to keep the operating point of a compressor from crossing to the left of an aggressively calibrated surge line, boost pressure and engine torque output may fall short of the torque demanded at the tip-in. This can reduce vehicle performance and degrade vehicle drivability.

In one example, the above issue may be addressed by a method for a boosted engine, comprising: adapting a surge line of a compressor map during vehicle operation as a function of vehicle speed. In this way, tip-in whoosh can be addressed without losing boosted engine performance at the tip-in.

As an example, an engine system may include a compressor having a compressor recirculation path coupling an outlet of the compressor (e.g., upstream or downstream of a charge air cooler coupled to the compressor), to an inlet of the compressor. Flow through the recirculation path may be controlled via a continuously variable valve. An engine controller may continually adjust a position of the valve, during steady-state and transient engine operating conditions, based on changes in intake air flow so as to maintain a compressor flow rate at or above a surge constrained flow rate (that is, a compressor flow rate at a surge limit (e.g., hard surge line) of the compressor). In addition, the controller may continually adapt the surge line on the compressor map based on vehicle operating conditions including vehicle speed in addition to compressor pressure ratio. Specifically, the surge line may be calibrated more aggressively when operating at lower vehicle speeds while the surge line may be calibrated less aggressively when operating at higher vehicle speeds. At higher vehicle speeds above a threshold vehicle speed, road and wind noise may mask turbo whoosh noise. Therefore, at higher vehicle speeds, a first surge line adapted with less aggressive calibration may be utilized in order to give priority to drivability over NVH reduction. At lower vehicle speeds below the threshold vehicle speed, road and wind noise may not be sufficient to mask turbo whoosh noise. Therefore, at lower vehicle speeds, when drivability concerns are lower, a second surge line with more aggressive calibration may be utilized in order to mitigate NVH issues. Thus, in response to a tip-in occurring at a vehicle speed below the threshold vehicle speed to vehicle speeds above the threshold, tip-in whoosh may be reduced by adjusting an opening of the CCRV to operate the compressor outside of (e.g., at a higher compressor flow rate) a first surge line adapted with the more aggressive calibration. In comparison, during a tip-out occurring at a vehicle speed above the threshold vehicle speed to lower vehicle speeds below the threshold vehicle speed, tip-out surge may be reduced by adjusting the opening of the CCRV to operate the compressor outside of (e.g., at a higher compressor flow rate) a second, different surge line adapted with the less aggressive calibration. In one example, the compressor may be operated to the right of the corresponding surge line following the CCRV adjustments. At each drive cycle, the adaptation of the surge line and the incidence of actual surge (or whoosh) may be learned so as to update the surge line calibration table. In some examples, the surge line may be further adapted based on engine speed.

In this way, a compressor surge line may be calibrated as a function of vehicle speed in order to take advantage of vehicle noise at higher vehicle speed conditions to mask whoosh noise while prioritizing NVH mitigation at lower vehicle speeds. Consequently, it may be possible to provide the technical result of achieving a balanced trade-off between drivability and NVH reduction, thereby improving consumer satisfaction in a wide range of operating conditions.

DETAILED DESCRIPTION

Figure 1:
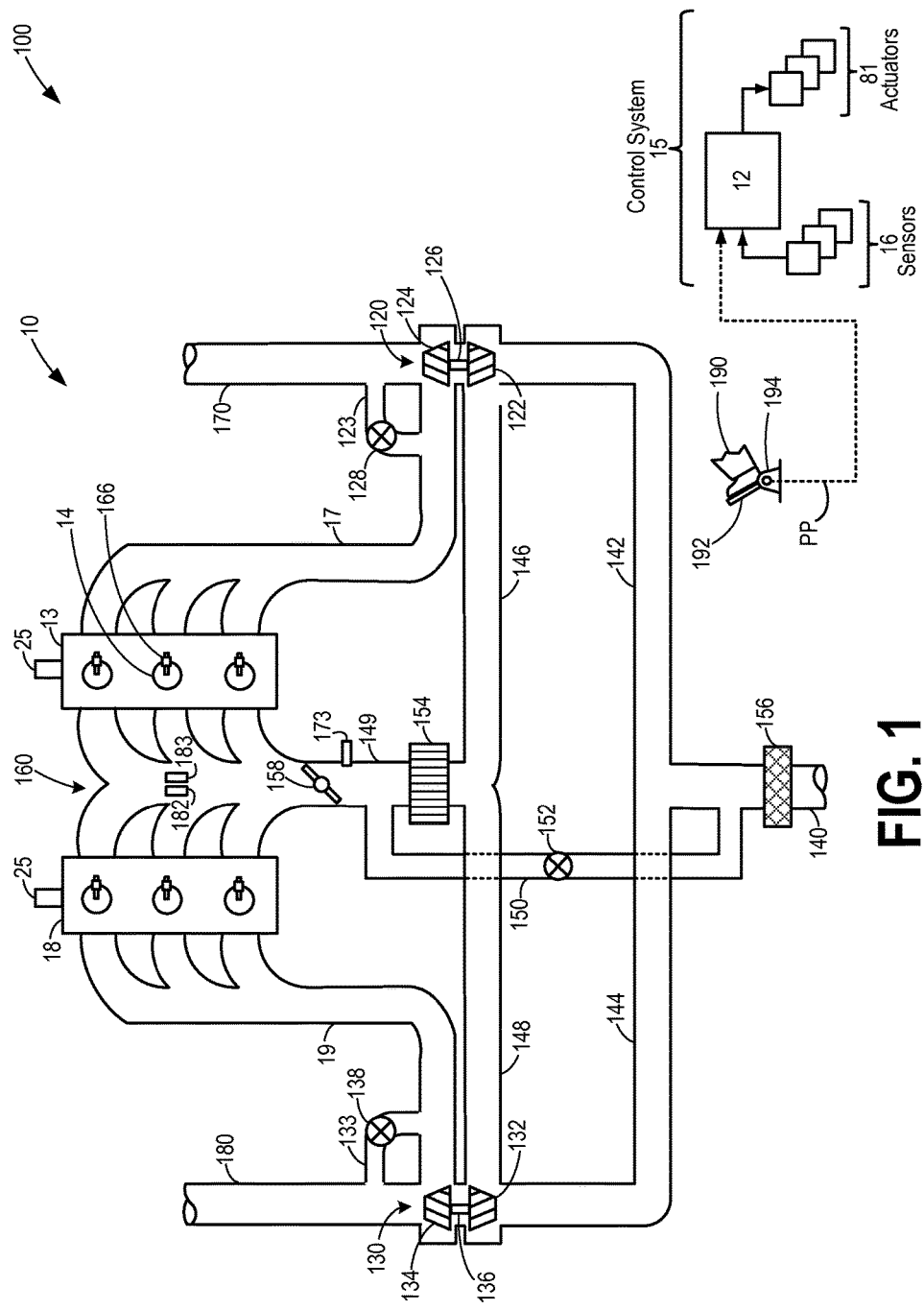
FIG. 1 shows an example boosted engine system including a compressor recirculation valve.

The following description relates to systems and methods for calibrating a surge line of a compressor map (such as the map shown in FIG. 2) for a compressor included in a boosted engine system, such as the system of FIG. 1. For example, drivability may be reduced when the surge line is calibrated aggressively to avoid compressor operation in soft surge regions for noise vibration and harshness (NVH) reduction as illustrated in FIGS. 3-4B. In order to obtain a balanced tradeoff between drivability and NVH mitigation, a controller may be configured to perform a control routine, such as the routines of FIGS. 6A-7 to adjust calibration of the surge line based on vehicle speed and/or engine speed in addition to compressor pressure ratio. Further, the controller may adjust the calibration according to the method of FIGS. 5A-5C to determine a final surge line of the compressor based on vehicle speed and/or engine speed. Example calibration of surge line based on vehicle and/or engine speed is shown in FIG. 8.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. Engine system 100 may be a split-engine system wherein intake passage 140 is branched downstream of air filter 156 into first branch and second branch intake passages, each including a turbocharger compressor. In the resulting configuration, at least a portion of intake air is directed to compressor 122 of turbocharger 120 via a first branch intake passage 142 and at least another portion of the intake air is directed to compressor 132 of turbocharger 130 via a second branch intake passage 144 of the intake passage 140.

The first portion of the total intake air that is compressed by compressor 122 may be supplied to intake manifold 160 via a first parallel branched intake passage 146. In this way, intake passages 142 and 146 form a first combined branch of the engine's air intake system. Similarly, a second portion of the total intake air can be compressed via compressor 132 and may be supplied to intake manifold 160 via second parallel branched intake passage 148. Thus, intake passages 144 and 148 form a second combined branch of the engine's air intake system. As shown in FIG. 1, intake air from intake passages 146 and 148 can be recombined via a common intake passage 149 before reaching intake manifold 160, where the intake air may be provided to the engine.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Common intake passage 149 may include a charge air cooler 154 and an intake throttle 158. The position of intake throttle 158 can be adjusted via a throttle actuator (not shown) communicatively coupled to controller 12. A throttle inlet pressure (TIP) sensor 173 may be coupled to common intake passage 149 at a location upstream of intake throttle 158 and downstream of air cooler 154. Further, TIP sensor 173 may be located downstream of compressors 122 and 132. Throttle inlet pressure, also referred to as the boost pressure or charging pressure, may be estimated by TIP sensor 173. In one example, the TIP sensor may be utilized to determine compressor surge conditions based on a frequency and/or amplitude of a signal from the TIP sensor. As such, the TIP sensor may have a bandwidth greater than 100 Hertz which may be suitable for detecting compressor surge.

A compressor recirculation passage 150 may be provided for compressor surge control. Specifically, to reduce compressor surge, such as on a driver tip-out, boost pressure may be dumped from the intake manifold, from downstream of air cooler 154 and upstream of intake throttle 158, to intake passage 140 (in particular, downstream of air filter 156 and upstream of the junction of intake passages 142 and 144). By flowing boosted air from upstream of an intake throttle inlet to upstream of the compressor inlets, the surge region can be avoided.

Flow through compressor recirculation passage 150 may be regulated by adjusting the position of compressor recirculation valve 152 (CRV 152) positioned therein. CRV 152 may also be termed a compressor surge valve, a compressor bypass valve (CBV), a diverter valve, etc. In the depicted example, compressor recirculation valve 152 may be a continuously variable valve whose position can be adjusted to a fully open position, a fully closed position, or any position there-between. Thus, compressor recirculation valve 152 may also be referred to herein as a continuously variable compressor recirculation valve, or CCRV. In the depicted example, CCRV 152 is configured as a throttle valve, although in other embodiments, the CCRV may be configured differently (e.g. as a poppet valve). Accordingly, CCRV 152 may include a throttle (e.g., as a throttle plate) as well as a position sensor for communicating a change in position of the throttle of the CCRV to the controller 12. The position sensor for the throttle of the CCRV (or simply CRV) may also be referred to as throttle position sensor (TPS) or CCRV throttle position sensor. It will be appreciated that while the CCRV is shown configured for a V-6 twin turbocharged engine in FIG. 1, the CCRV may be similarly applied in other engine configurations, such as applied to I-3, I-4, V-8, and other engine configurations with one or multiple turbochargers.

In an alternate configuration, the compressor recirculation passage may be located such that compressed air flows from upstream of air cooler 154 to a location upstream of compressors 122 and 132. In another configuration, there may be two recirculation paths, each with a recirculation valve, each located such that compressed air travels from the compressor exit to the compressor inlet. It will also be appreciated that the methods described herein may be applied to a compressor recirculation valve that is not continuously variable.

During nominal engine operating conditions, the continuously variable compressor recirculation valve 152 may be kept nominally closed, or nearly closed. In such a position, the valve may be operating with known or negligible leakage. Then, in response to surge, an opening of the CCRV 152 may be increased. In some embodiments, one or more sensors may be coupled in compressor recirculation passage 150 to determine the mass of recirculated flow delivered from the throttle inlet to the intake passage. The various sensors may include, for example, pressure, temperature, and/or flow sensors.

In alternate embodiments, the compressor recirculation valve may be configured as a two-position valve adjustable to one of a fully closed and a fully open position. However, boost regulation may be improved by using a CCRV. In addition, by coordinating the operation of the CCRV with those of a wastegate, boost response and surge margins can be improved. As such, the impact of the opening or closing of the CCRV 152 on boost pressure may be substantially immediate. This allows rapid boost and surge control.

Engine 10 may include a plurality of cylinders 14. In the depicted example, engine 10 includes six cylinders arranged in a V-configuration. Specifically, the six cylinders are arranged on two banks, first bank 13 and second bank 18, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted via bank-specific parallel exhaust passages. In the depicted example, first bank 13 of cylinders of engine 10 can exhaust products of combustion via a first parallel exhaust passage 17 and second bank 18 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass exhaust turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of intake passage 144 of the engine's intake system. Alternatively, some or all of the exhaust gas flowing through exhaust passage 19 can bypass exhaust turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors (not shown).

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. Cam actuation systems may include one or more cams mounted on one or more camshafts and may utilize one or more of cam profile switching (CPS), variable cam timing (VCT), variable valve timing (VVT) and/or variable valve lift (VVL) systems that may be operated by controller 12 to vary valve operation.

Engine system 100 may be controlled at least partially by a control system 15 including controller 12 and by input from a vehicle operator 190 via an input device 192. In this example, input device 192 includes an accelerator pedal and a pedal position sensor 194 for generating a proportional pedal position signal PP.

Control system 15 is shown receiving information from a plurality of sensors 16 (various examples of which are described herein) and sending control signals to a plurality of actuators 81. As one example, sensors 16 may include TIP sensor 173, a humidity sensor, MAP sensor 182, and MCT sensor 183. In some examples, a throttle inlet temperature sensor for estimating a throttle air temperature (TCT) may be located upstream of intake throttle 158. As another example, actuators 81 may include CCRV 152, fuel injector 166 intake throttle 158, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 5A-5C, and FIGS. 6-7.

Figure 2:
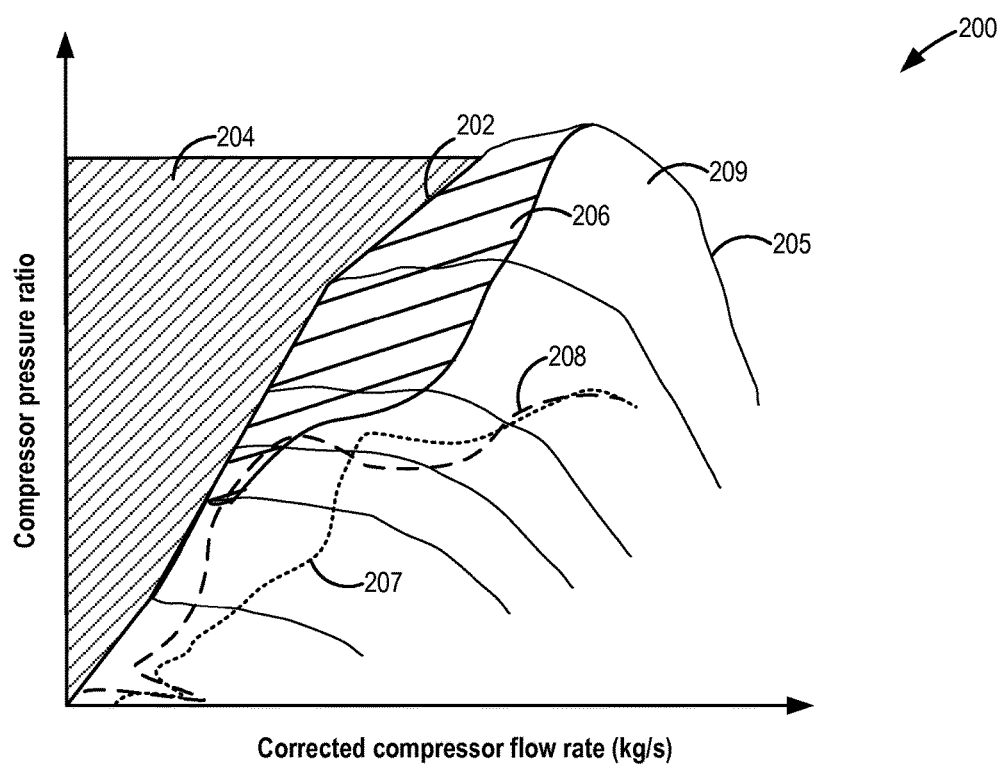
FIG. 2 shows an example compressor map including vehicle response based on compressor recirculation flow.
Figure 3:
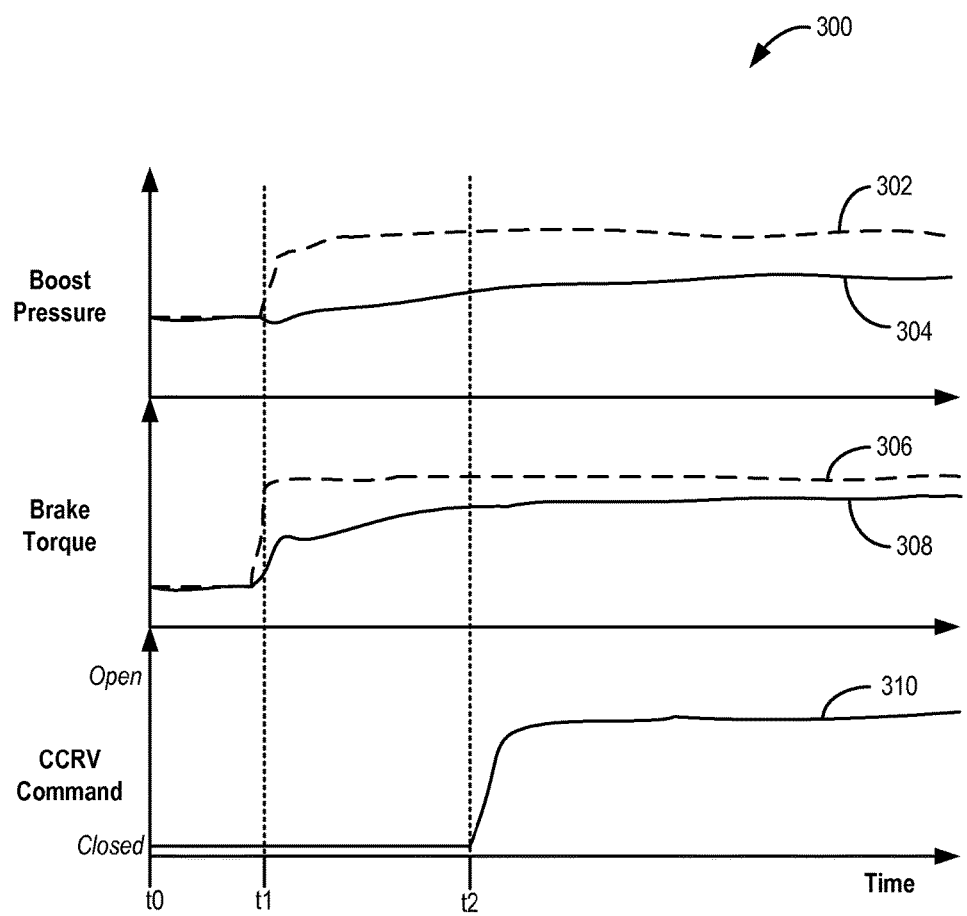
FIG. 3 shows an example tip-in performance in response to aggressive surge line calibration.

Engine controller 12 may utilize a map, such as the map of FIG. 2, to identify whether the compressor is operating in or around a surge region. In particular, map 200 of FIG. 2 shows a change in compressor pressure ratio (along the y-axis) at different compressor flow rates (along the x-axis). The map includes contour lines 205 representing constant compressor speed. Line 202 shows a surge line. Compressor operation to the left of surge line 202 results in operation in a hard surge region 204 (shaded region). As such, compressor operation in hard surge region 204 results in objectionable NVH and potential degradation of engine performance. Hard surge can occur during transient conditions when the engine airflow requirement suddenly decreases, such as during an operator pedal tip-out. This condition typically requires a rapid decrease in compressor outlet pressure and/or sufficient compressor flow rate to avoid surge. When expected to enter this region, the compressor recirculation valve may be opened to keep compressor operation away from surge line 202. That is, the compressor operating point may be kept to the right of surge line 202. For example, by opening the compressor recirculation valve, a compressor flow rate may be increased and a compressor outlet pressure may be decreased. Consequently, compressor operating point may be kept to the right of surge line 202.

Soft surge can occur in soft surge region 206 of the compressor map where, in this example, the compressor speed lines have a positive slope. Soft surge is characterized by small-amplitude oscillations in pressure and flow during otherwise steady state conditions. When amplitude and frequency of the oscillations increase beyond a threshold, audible NVH and drivability concerns increase. In order to avoid compressor operation in the soft surge region, the surge line may be calibrated more aggressively. Consequently, the CRV may be opened to increase flow in order to move the compressor operation to the right of the surge line.

A desired compressor recirculation valve flow (that is, the desired recirculation flow through the compressor recirculation valve) required to operate the compressor to the right of the surge line (that is, to operate the compressor at a higher flow rate than the surge line) may be determined by utilizing the following equation:

$$\dot{m}_{crv} = \dot{m}_{SL} - \dot{m}_{thr}$$

Where $\dot{m}_{crv}$ is the desired compressor recirculation valve flow, $\dot{m}_{thr}$ is an estimated engine throttle flow, and $\dot{m}_{SL}$ is the minimum compressor flow required to operate the compressor to the right of the surge line. As such, $\dot{m}_{SL}$ may be defined to include the appropriate margin to account for part to part variability and/or other noise factors that may affect the compressor state at which hard or soft surge may occur.

Further, the CRV may be utilized to avoid a tip-in whoosh condition that may occur during a tip-in. The tip-in whoosh condition is closely related to soft surge, and may lead to undesirable noise resulting in increased NVH and drivability concerns during the tip-in. In order to avoid compressor operation in regions on the map that may lead to tip-in whoosh, the surge line may be calibrated more aggressively so as to open the CRV in the regions prone to tip-in whoosh which may include soft surge region 206. That is, the surge line may be moved more to the right on the compressor map. In one example, calibrating the surge line aggressively may include moving the surge line 202 beyond (that is, to the right of) the soft surge region. By opening the CRV, compressor flow may be increased. Consequently, compressor operation may be moved to the right of the aggressively calibrated surge line. An example compressor operation during a tip-in when the CRV is closed is depicted by line 208. When there is no compressor recirculation (that is, when CRV is closed), the compressor operates in the soft surge region during the tip-in causing the tip-in whoosh. An example compressor operation during the tip-in when CRV is opened is depicted by line 207. When recirculation flow is added (by opening the CRV, for example), the compressor operates to the right of the soft surge region. As a result, compressor operation is moved away from the soft surge region, and tip-in whoosh is reduced. For example, in order to mitigate hard surge, soft surge, and tip-in whoosh conditions, it may be desirable for compressor operation to remain outside both hard surge region 204 and soft surge region 206 (that is, in no surge region 209) whenever possible, including during steady-state and transient engine operating conditions. Therefore, the surge line may be calibrated more aggressively. In other words, the surge line may be calibrated such that the surge line is located more towards the right on the compressor map. For example, at a given compressor pressure ratio, a first compressor flow rate of a first corresponding operating point on a more aggressively calibrated surge line may be greater than a second compressor flow rate of a second corresponding operating point on a less aggressively calibrated surge line. However, if the surge line is calibrated more aggressively, insufficient turbine power may be available to generate desired boost, leading to torque loss.

An example reduction in tip-in performance in response to aggressive surge line calibration is shown at FIG. 3. Specifically, FIG. 3 shows an operating sequence 300 depicting an example engine performance during a tip-in condition when the surge line is calibrated aggressively. FIG. 3 illustrates desired boost pressure at plot 302, actual boost pressure at plot 304, desired brake torque at plot 306, actual brake torque at plot 308, and CCRV opening amount at plot 310. Vertical markers t0-t2 represent times of interest during the sequence. In all the plots discussed below, the X axis represents time and time increases from the left side of each plot to the right side of each plot.

The first plot from the top of FIG. 3 represents boost pressure versus time, wherein the Y axis represents boost pressure and the boost pressure increases in the direction of Y axis arrow.

The second plot from the top of FIG. 3 represents brake torque versus time, wherein the Y axis represents brake torque increasing in the direction of Y axis arrow.

The third plot from the top of FIG. 3 represents CCRV opening versus time, wherein an opening of the CCRV increases in the direction of Y axis arrow.

At time t1, in response to a tip-in event, a desired boost pressure and a desired torque may increase. However, due to aggressive surge line calibration, these requests may cause the compressor operating point to move to the left of the surge line. In order to keep the compressor operation away from the region to the left of the surge line, the CCRV may be commanded open (at t2). By opening the CCRV, compressor flow may increase. As a result, the operating point of the compressor may move to the right of the aggressively calibrated surge line and into the non-surge region. However, due to increase in CCRV opening in response to the tip-in (as a result of aggressive surge line calibration), the amount of turbine energy required to achieve the desired boost increases and may exceed the available energy. Consequently, the actual boost and torque may not reach desired values leading to decreased engine performance. The inventors herein have recognized that as a degree of aggressiveness of surge line calibration increases, engine torque output may decrease.

Figure 4A:
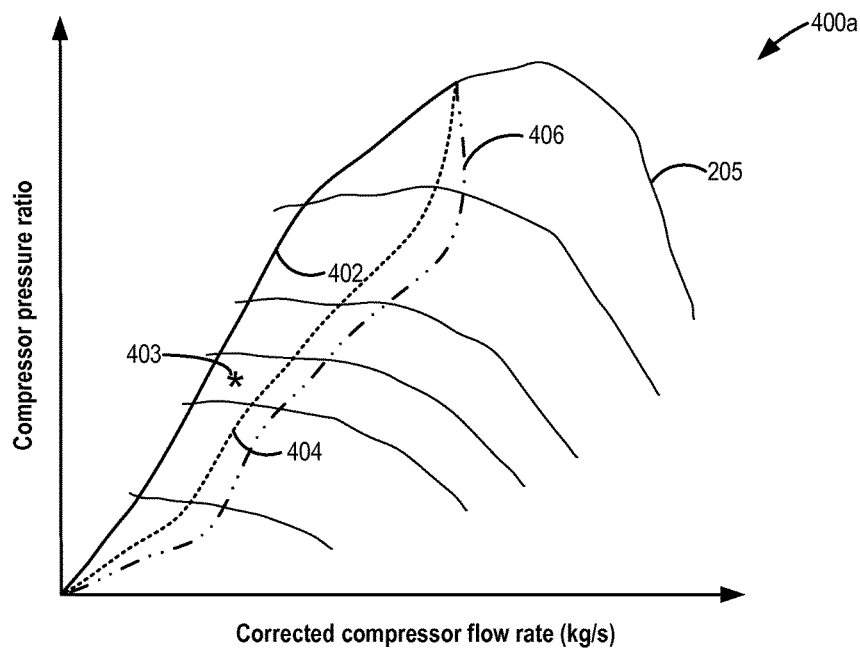
FIG. 4A shows an example compressor map including a plurality of surge lines calibrated with varying degrees of aggressiveness.
Figure 4B:
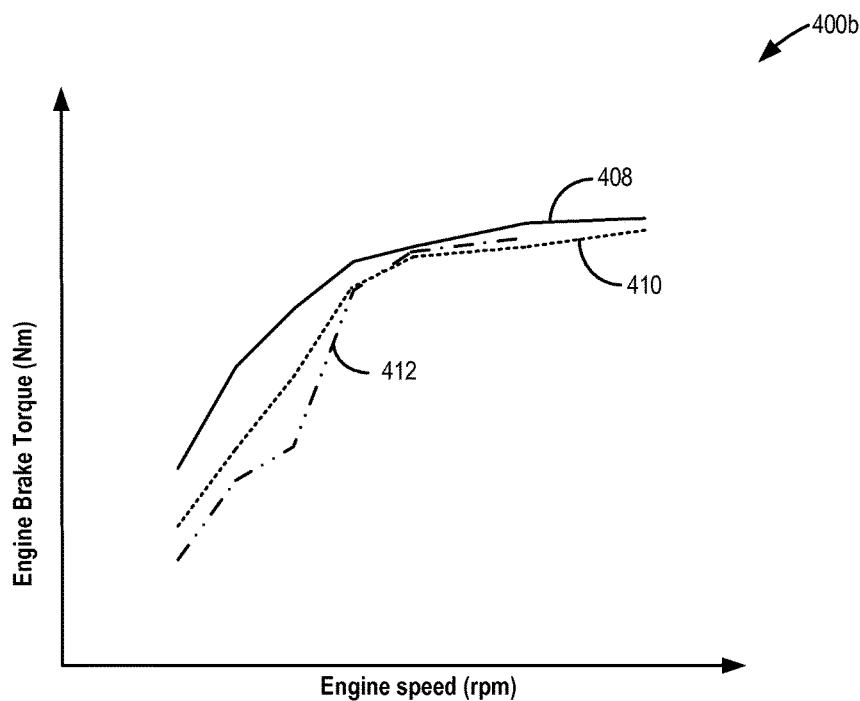
FIG. 4B shows an example brake torque plot including engine performance at each of the surge lines of FIG. 4A.

An example change in torque with change in surge line calibration aggressiveness is shown at FIGS. 4A and 4B. Specifically, FIG. 4A shows a map 400a indicating a change in compressor pressure ratio (along the y-axis) at different compressor flow rates (along the x-axis). Map 400a includes contour lines 205 representing different compressor speeds and surge lines 402, 404, and 406, each surge line with varying degrees of aggressiveness. For example, surge line 406 is more aggressively calibrated than surge line 404; and surge line 404 is more aggressively calibrated than surge line 402.

FIG. 4B shows a map 400b indicating change in engine brake torque (along the y-axis) at different engine speeds based on surge line calibration. For example, plot 408 shows change in engine brake torque with respect to engine speed when surge line 402 is utilized, plot 410 shows change in engine brake torque with respect to engine speed when surge line 404 is utilized, and plot 412 shows change in engine brake torque with respect to engine speed when surge line 406 is utilized. As depicted herein at FIGS. 4A and 4B, as the degree of aggressiveness of surge line calibration increases, in particular during engine operation in low to medium engine speeds, engine torque output may decrease. For example, when operating the compressor at an operating point 403, if a less aggressive surge line (e.g., surge line 402) is utilized; operating point 403 is located to the right of the less aggressive surge line 402. Consequently, surge mitigation operations such as opening the compressor recirculation valve in order to move the operating point to the right of the surge line may not be required.

However, if a more aggressively calibrated surge line (e.g., surge line 404 or surge line 406) is utilized (e.g., in order to avoid soft surge regions and tip-in whoosh conditions), compressor operating point 403 is located to the left of surge lines 404 and 406. Therefore, the compressor may be determined to be operating in the surge region and consequently, the compressor recirculation valve may be opened in order to increase compressor flow thereby, move the operating point to the right of surge line 404 and 406 so as to mitigate surge conditions. However, by opening the compressor recirculation valve, boost pressure may be decreased and consequently torque output may be reduced.

The inventors herein have recognized that during vehicle operating conditions when the vehicle speed is greater than a threshold vehicle speed, the road and wind noise may mask the turbo whoosh noise. Therefore, in order to improve engine torque output and give priority to drivability instead of NVH, during high vehicle speed conditions greater than a threshold vehicle speed, the surge line may be calibrated less aggressively. That is, the compressor surge line calibration may be based on vehicle speed such that a less aggressive calibration may be performed at high vehicle speeds above the threshold vehicle speed. By calibrating the surge line less aggressively, it may not be required to open the compressor recirculation valve to recirculate flow across the compressor in order to operate the compressor to the right of the surge line. As a result, boost pressure and torque output may meet the demand, and consequently drivability and tip-in performance may be improved. In some examples, at vehicle speeds above the threshold vehicle speed, when the less aggressively calibrated surge line is used, the compressor recirculation valve may be opened to operate the compressor to the right of the surge line calibrated less aggressively. However, an opening of the compressor recirculation valve required to operate the compressor to the right of the less aggressively may be less than an opening of the compressor recirculation valve required to operate the compressor to the right of a more aggressively calibrated surge line. However, when operating at low vehicle speeds, sufficient road and wind noise may not be available to mask the whoosh noise. Therefore, at low vehicle speeds, torque output may be traded for improved NVH and accordingly, more aggressive surge line calibration may be utilized.

Similarly, when the engine speed is greater than a threshold engine speed, the engine noise may mask the turbo whoosh noise. Therefore, during high engine speed conditions greater than the threshold engine speed, the surge line may be calibrated less aggressively. That is, the compressor surge line calibration may be based on engine speed such that a less aggressive calibration may be performed at high engine speeds. As a result, torque output and drivability may be improved at high engine speeds.

Further, the inventors have recognized that tip-in whoosh noise may not occur at very low engine speeds, and that the whoosh noise is observed during tip-in when operating at low to medium engine speeds. As a result, if the surge line is calibrated more aggressively, low-end torque (that is, torque at very low engine speeds) may be unnecessarily lost. Therefore, since whoosh noise may not occur during tip-in starting at very low engine speeds, less aggressive surge line calibration may be performed when the engine is operating at very low engine speeds in order to improve drivability. However, whoosh noise may be increased during tip-in occurring at low to medium engine speeds. Therefore, when operating in the low to medium engine speed region, more aggressive surge line calibration may be utilized in order to reduce NVH issues occurring due to tip-in whoosh conditions.

Taken together, the inventors have recognized that surge line may be calibrated as a function of vehicle speed and/or engine speed in addition to compressor pressure ratio. That is, when operating the vehicle at high vehicle speeds, high engine speeds, and very low engine speeds, less aggressive surge line calibration may be utilized. When operating the vehicle at low vehicle speeds and at low to medium engine speeds, more aggressive calibration may be utilized. Further, surge line calibration may be based on compressor pressure ratio. Details of calibrating the surge line based on vehicle speed and/or engine speed in addition to the compressor pressure ratio will be further elaborated with respect to mechanisms of FIGS. 5A-5C, routines of FIGS. 6A-7, and example of FIG. 8.

Transmission of noises to the driver compartment is very vehicle dependent. In some applications, it may be possible for the surge line to be calibrated based on vehicle speed alone. In others, the surge line may be calibrated based on engine speed alone. In yet others, the surge line may be calibrated based on both vehicle speed and engine speed.

The implemented approach will depend on the levels of the various noises, for example whoosh, engine noise, wind noise, etc.

In this way, by calibrating the surge line as a function of vehicle speed and/or engine speed in order to take advantage of vehicle noise and engine noise at high vehicle speed and engine speed conditions to mask whoosh noise, drivability may be improved. Further, by prioritizing NVH reduction when vehicle and engine noise are not sufficient for masking whoosh noise, a balanced trade-off between drivability and NVH reduction may be achieved, thereby improving consumer satisfaction in a wide range of operating conditions.

Figure 5A:
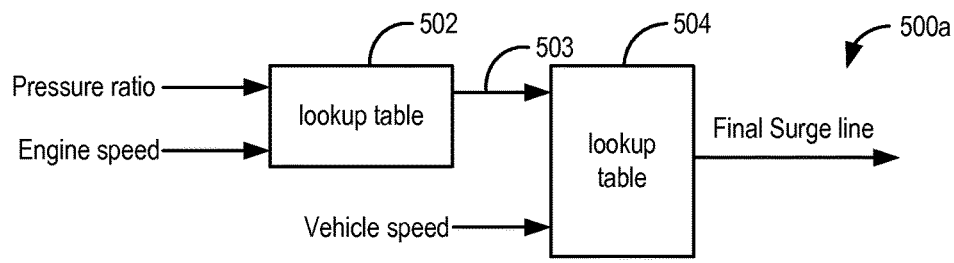
FIG. 5A shows a block diagram depicting a first example method for adjusting a surge line based on vehicle speed, engine speed and compressor pressure ratio according to the present disclosure.
Figure 5B:
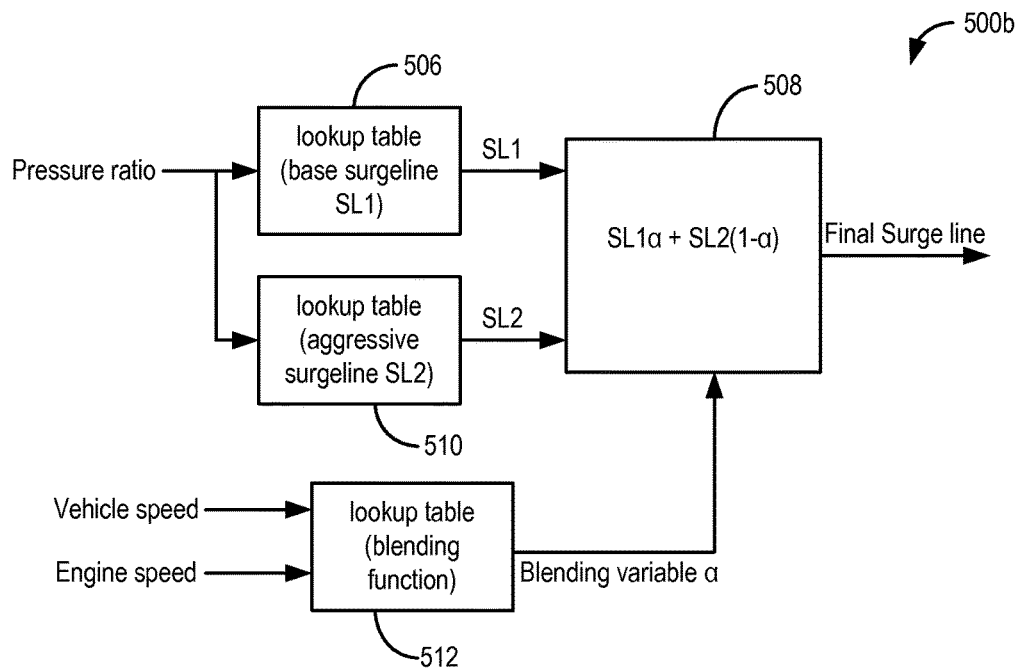
FIG. 5B shows a block diagram depicting a second example method for adjusting the surge line based on vehicle speed, engine speed and compressor pressure ratio according to the present disclosure.
Figure 5C:
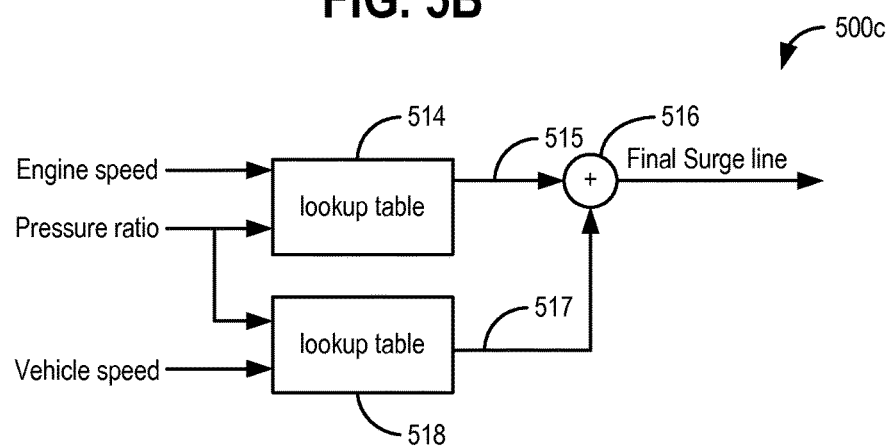
FIG. 5C shows a block diagram depicting a third example method for adjusting the surge line based on vehicle speed, engine speed and compressor pressure ratio according to the present disclosure.

FIGS. 5A, 5B, and 5C show block diagrams illustrating example methods for obtaining a desired final surge line based on vehicle speed, engine speed, and compressor pressure ratio. Specifically, FIG. 5A shows a method 500a for obtaining the desired final surge line by utilizing one or more look up tables; FIG. 5B shows a method 500b for obtaining the desired surge line by blending one or more surge line calibrations via a look up table; and FIG. 5C shows a method 500c for obtaining the desired final surge line by adding outputs of two look up tables.

Turning now to FIG. 5A, method 500a may include using a first look up table 502 that is a function of engine speed and pressure ratio. An output 503 of first table 502 may be utilized as input to a second look up table 504 that is a function of vehicle speed. Second table 504 may receive vehicle speed as another input. The desired final surge line for a given pressure ratio, engine speed, and vehicle speed may be obtained as an output of second table 504.

In some examples, pressure ratio and vehicle speed may be utilized as inputs to first table 502; and output of first table and vehicle speed may be utilized as inputs to second table 504.

Turning to FIG. 5B, method 500b may include utilizing two surge line calibrations including an aggressive surge line calibration and a non-aggressive surge line calibration, wherein both the aggressive and the non-aggressive calibrations are based on compressor pressure ratio. For example, a first look up table 506 may be utilized to generate a base line surge line (SL1) without aggressive calibration, and a second look up table 510 may be utilized to generate an aggressive surge line (SL2) with aggressive calibration. Subsequently, the baseline (SL1) and the aggressive surge line (SL2) may be blended as a weighted function of engine speed and vehicle speed via a look up table to obtain the desired final surge line. For example, a blending variable $\alpha$ may be determined as a function of engine speed and vehicle speed, and the blending function may be defined as SL1$\alpha$+ SL2(1−$\alpha$). Further, a value of the blending variable may vary between 0 and 1.

In one example, a degree of aggressiveness of the final surge line calibration may vary based on a value of the blending variable $\alpha$. For example, as the value of the bending variable $\alpha$ decreases the degree of aggressiveness may increase. As an example, the final surge line may be more aggressively calibrated when the blending variable has a value of zero relative to the calibration when the blending variable has a value of one.

Turning to FIG. 5C, method 500c may include utilizing a look up table 514 including engine speed and pressure ratio as inputs, and a look up table 518 including vehicle speed and pressure ratio as inputs. Output 515 of table 514 and output 517 of table 518 may be added to obtain the final surge line.

It will be appreciated that while the examples illustrated herein show calibration of the surge line based on vehicle speed and engine speed, in some examples, the surge line may be calibrated as a function of vehicle speed alone. In some other examples, the surge line may be calibrated as a function of engine speed alone.

In one example, a degree of aggressiveness of calibration required to obtain the desired final surge line may be based on pressure ratio, engine speed and vehicle speed. Accordingly, the methods of FIGS. 5A, 5B, and 5C may utilize pressure ratio, engine speed, and vehicle speed to determine a degree of aggressiveness of calibration required to obtain the desired final surge line. For example, at higher vehicle speeds greater than a threshold vehicle speed, and/or at higher engine speeds greater than a first threshold engine speed, a less aggressive calibration may be implemented to obtain the final surge line. Further, at very low engine speeds less than a second threshold engine speed, less aggressive calibration may be implemented to obtain the final surge line. However, at low vehicle speeds less than the threshold vehicle speed, and at engine speeds between the first threshold engine speed and the second threshold engine speed, more aggressive calibration may be implemented to obtain the final surge line. Details of determining the type of calibration (more or less aggressive) for obtaining the final surge line based on vehicle speed and/or engine speed will be further elaborated with respect to FIGS. 6A and 6B.

In one example, the method of FIGS. 5A-5C provide for a method for a boosted engine, comprising: adapting a surge line of a compressor map during vehicle operation as a function of vehicle speed; wherein the surge line is further adapted as a function of engine speed and compressor pressure ratio. The method further includes wherein the adapting includes adapting the surge line with a more aggressive calibration at a vehicle speed below a threshold vehicle speed, and adapting the surge line with a less aggressive calibration at the vehicle speed above the threshold vehicle speed; and wherein the surge line adaptation is learned over one or more vehicle drive cycles. Still further, the method includes wherein adapting the surge line includes adapting boundaries for each of a hard surge region and a soft surge region of the compressor map.

Further, the method includes wherein the adapting includes using a first table and a second table in succession, wherein two of the engine speed, pressure ratio and vehicle speed are input into the first table and an output of the first table is input with a remaining of the engine speed, pressure ratio and vehicle speed into the second table, and wherein an output of the second table is used to adapt the surge line.

Still further, the method includes wherein the adapting includes determining a first more aggressive surge-line calibration as a function of the compressor pressure ratio, determining a second less aggressive surge-line calibration as a function of the compressor pressure ratio; and blending the first and the second surge-line calibrations as a weighted function of vehicle speed and engine speed.

Still further, the method includes wherein the adapting includes determining a final surge line based on a sum of a first output of a first table and a second output of a second table; and wherein the first table is obtained as a function of engine speed and compressor pressure ratio, and the second table is obtained as a function of vehicle speed and compressor pressure ratio.

The method may further comprise adjusting an opening of a continuously variable compressor recirculation valve during the vehicle operation to maintain compressor operation at a higher compressor flow rate than a compressor flow rate of the adapted surge line; wherein the adjusting includes estimating a desired throttle mass flow based on engine operating conditions; estimating a threshold compressor flow rate based on the adapted surge line; and adjusting an opening of the CCRV based on a difference between the desired throttle mass flow and the threshold flow rate.

Further, the method includes wherein adapting the surge line as a function of vehicle speed includes adapting the surge line with a more aggressive calibration during a tip-in occurring at a lower vehicle speed below a threshold vehicle speed to a higher vehicle speed above the threshold vehicle speed and adapting the surge line with a less aggressive calibration during a tip-out from the higher vehicle speed to the lower vehicle speed.

In another example, a method for a boosted engine may comprise adapting a surge line of a compressor map during vehicle operation as a function of engine speed alone.

In still another example, a method for a boosted engine may comprise adapting a surge line of a compressor map during vehicle operation as a function of both vehicle speed and engine speed.

Figure 6A:
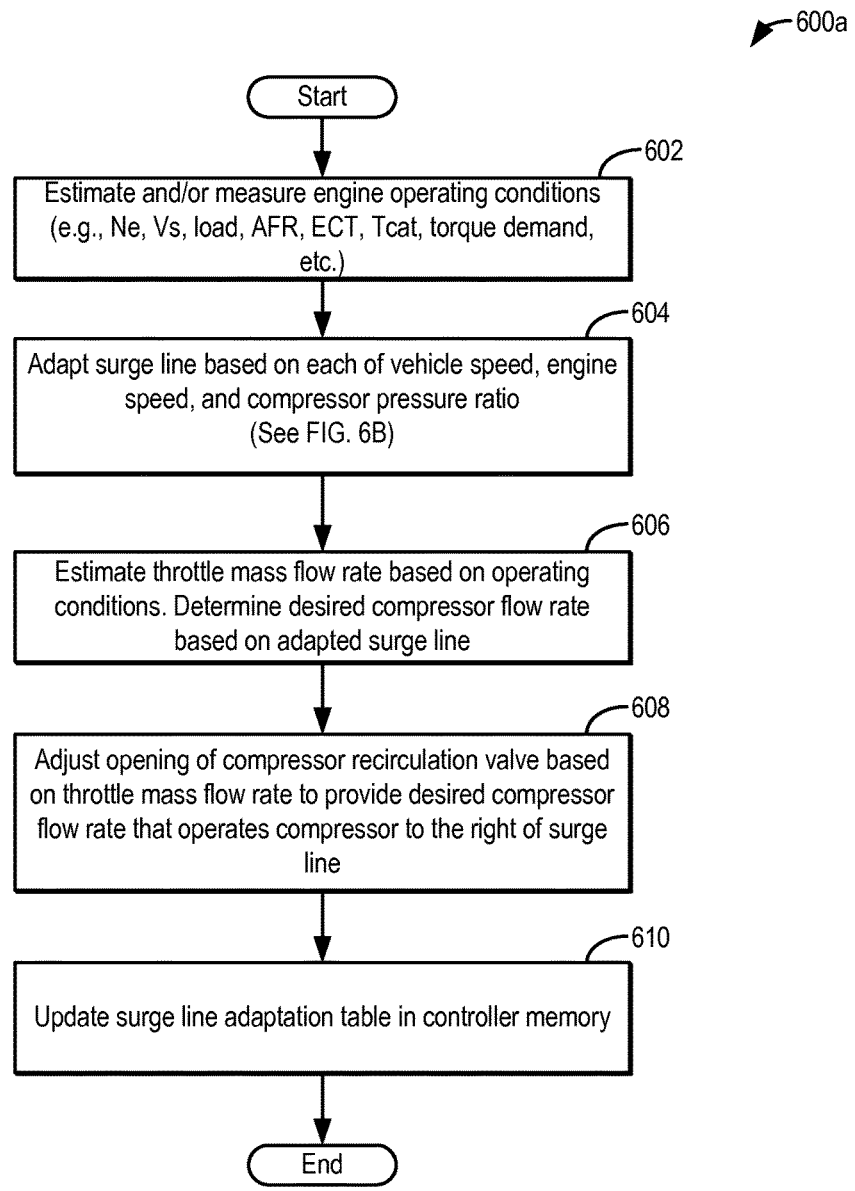
FIG. 6A shows a high level flow chart illustrating an example method for calibrating a surge line and adjusting a compressor recirculation valve based on the calibrated surge line according to the present disclosure.

Now turning to FIG. 6A, an example method 600 for adjusting an opening of a compressor recirculation valve (e.g. recirculation valve 152 at FIG. 1) based on a calibrated surge line is shown. The method of FIG. 6 may be included in the system of FIG. 1 as executable instructions stored in non-transitory memory.

At 602, method 600 includes estimating and/or measuring engine operating conditions. The estimated conditions may include, for example, engine speed (Ne), vehicle speed (Vs), torque demand, boost pressure, MAP, MAF, engine temperature, combustion air-fuel ratio (AFR), exhaust catalyst temperature, ambient conditions, etc.

At 604, method 600 includes adapting the compressor surge line based on each of vehicle speed, engine speed, and compressor pressure ratio. Specifically, the surge line may be adjusted based the vehicle speed, the engine speed, and the compressor pressure ratio. Details of adapting the surge line have been provided in FIG. 5A, FIGS. 5B and 5C. Another method will be further elaborated with respect to FIG. 6B.

Upon adapting the surge line, method 600 may proceed to 606. At 606, method 600 includes estimating the throttle mass flow based on operating conditions. For example, the throttle mass flow may be estimated based on a sensor output (e.g., MAP sensor output) or from desired throttle mass flow. Further, at 606, method 600 may include estimating a desired compressor flow rate (or threshold flow rate) based on the throttle mass flow rate and a compressor surge limit. As such, the desired compressor flow rate (or threshold flow rate) may be a surge constrained compressor flow rate that is based on a surge limit of the compressor and that takes into account noise factors, such as part-to-part variability, that may affect the compressor state at which hard or soft surge occurs.

Next, at 608, method 600 includes adjusting an opening the compressor recirculation valve based on the throttle mass flow rate to provide the desired compressor flow rate that operates the compressor to the right of the surge line. It will be appreciated that the estimating of the throttle mass flow and the desired compressor flow rate may be performed during all engine operating conditions including during steady-state and transient conditions. By continually estimating the throttle mass flow and adjusting a compressor recirculation flow in accordance to maintain the compressor flow rate at or above the desired compressor flow rate, the compressor state may be maintained outside of (specifically, to the right of) a hard surge and a soft surge region.

In one example, the controller may estimate the throttle mass flow rate based on the manifold pressure sensor or the desired throttle flow rate and calculate the surge constrained compressor flow rate based on the compressor's (hard) surge limit. The controller may then determine a desired compressor recirculation rate (that is, a net recirculation flow rate across the compressor via any combination of the first and second recirculation paths) based on a difference between the surge constrained compressor flow rate and the throttle mass flow rate.

Figure 6B:
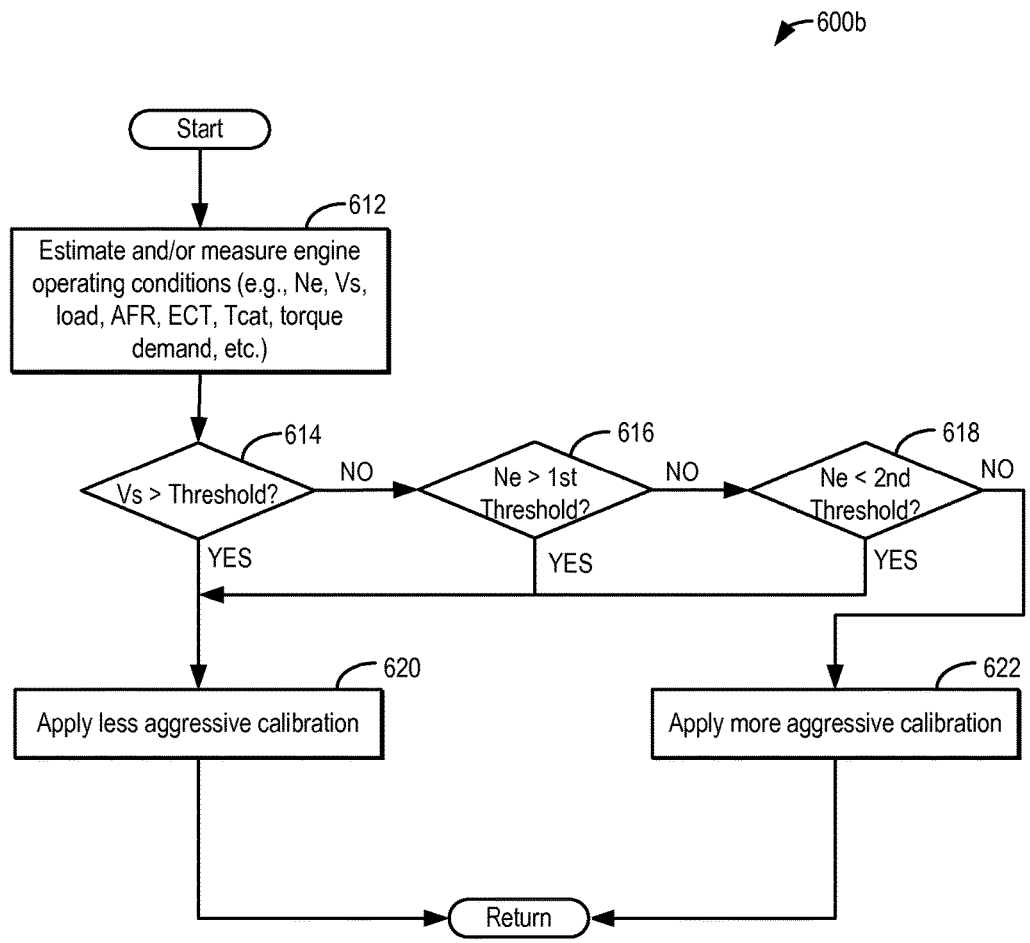
FIG. 6B shows a high level flow chart illustrating an example method for determining a type of calibration to be applied during the calibration of the surge line shown at FIG. 6A, according to the present disclosure.

FIG. 6B shows an example method for adapting a compressor surge line (e.g. surge line 202 at FIG. 2) based on vehicle speed and/or engine speed is shown. Adapting the compressor surge line may include determining a level of aggressiveness (also herein referred as a degree of aggressiveness) based on vehicle and/or engine speed. For example, the surge line may be more aggressive or less aggressive based on vehicle and/or engine speed conditions. By implementing the less aggressive calibration, priority may be given to drivability over NVH. By implementing the more aggressive calibration, NVH reduction may be prioritized. The method of FIG. 6B may be included in the system of FIG. 1 as executable instructions stored in non-transitory memory.

At 612, method 600 includes estimating and/or measuring engine operating conditions. The estimated conditions may include, for example, engine speed (Ns), vehicle speed (Vs), torque demand, boost pressure, MAP, MAF, engine temperature, combustion air-fuel ratio (AFR), exhaust catalyst temperature, ambient conditions (e.g., BP), etc.

Next, at 614, method 600 includes determining if a vehicle speed is greater than a threshold vehicle speed. If the answer is YES, method 600 may proceed to 620. At 620, method 600 may include applying a less aggressive calibration for adjusting the surge line. For example, at higher vehicle speeds (e.g. at vehicle speeds greater than the threshold vehicle speed), road and wind noises may mask the turbo whoosh noise. Therefore, a less aggressive calibration may be used in order to prioritize drivability over NVH. Less aggressive calibration may include adjusting the surge line to the left of a base line surge line on the compressor map. That is, a delta adjustment may be performed on the base line surge line such that the entire surge line may be moved to the left of the compressor map resulting in a decrease in an area to the left of the adapted surge line compared to an area to the left of the base line surge line. In one example, the base line surge line may be a manufacturer calibrated surge line based on component bench data. In some examples, the base line surge line may be a surge line calibrated at the threshold vehicle speed.

Further, in one example, the delta adjustment may be a calibratable constant. In another example, the delta adjustment may be based on a difference between a current vehicle speed and the threshold vehicle speed, wherein the delta adjustment may increase with increase in the difference. While the example discussed herein shows delta adjustment based on vehicle speed when the vehicle speed is greater than the threshold, in some examples, the delta adjustment may be based on the vehicle speed and the engine speed.

Returning to 614, if it is determined that the vehicle speed is less than the threshold speed; method 600 may proceed to 616. At 616, method 600 includes determining if an engine speed is greater than a first threshold engine speed. If the answer at 616 is YES, method 600 may proceed to 620. At 620, the less aggressive calibration for adjusting the surge line may be applied. For example, at higher engine speeds (e.g. at engine speeds greater than the first threshold), the engine noise may mask the turbo whoosh noise. Therefore, the less aggressive calibration may be used in order to prioritize drivability over NVH. Less aggressive calibration may include applying the delta adjustment to move the surge line to the left of a base line surge line on the compressor map the compressor map. As discussed above, in one example, the base line surge line may be a manufacturer calibrated surge line. In another example, the base line surge line may be a surge line calibrated at the threshold engine speed.

Further, in one example, the delta adjustment may be a calibratable constant. In some examples, the delta adjustment may be based on a difference between a current engine speed and the first threshold engine speed, wherein the delta adjustment may increase with increase in the difference. While the example discussed herein shows delta adjustment based on engine speed when the engine speed is greater than the first threshold, in some examples, the delta adjustment may be based on the vehicle speed and the engine speed.

Returning to 616, if it is determined that the engine speed is less than the first threshold; method 600 may proceed to 618. At 618, method 600 includes determining if the engine speed is less than a second threshold speed. The second threshold engine speed may be less than the first threshold engine speed. If the answer at 618 is YES, method 600 may proceed to 620. At 620, the less aggressive calibration for adjusting the surge line may be applied. For example, at very low engine speeds (e.g., at engine speeds less than the second threshold), the compressor surge related noise may not contribute significantly to NVH. Therefore, the less aggressive calibration may be used in order to prioritize drivability over NVH. Less aggressive calibration may include applying the delta adjustment to move the surge line to the left of a base line surge line on the compressor map the compressor map. As discussed above, in one example, the base line surge line may be a manufacturer calibrated surge line. In another example, the base line surge line may be a surge line calibrated at the second threshold engine speed.

Further, in one example, the delta adjustment may be a calibratable constant. In some examples, the delta adjustment may be based on a difference between the second threshold engine speed and a current engine speed, wherein the delta adjustment may increase with increase in the difference. While the example discussed herein shows delta adjustment based on engine speed when the engine speed is less than the second threshold, in some examples, the delta adjustment may be based on the vehicle speed and the engine speed.

Returning to 618, if it is determined that the engine speed is greater than the second threshold and less than the first threshold, method 600 may proceed to 622. At 622, method 600 includes applying a more aggressive surge line calibration. At low to medium engine speeds (e.g., at engine speeds between the first and the second threshold engine speed), and at low vehicle speeds (e.g., at vehicle speeds below the threshold vehicle speed) the vehicle and/or the engine noise may not be sufficient to mask the turbo whoosh noise. Therefore, at low to medium engine speeds and at low vehicle speeds, the more aggressive surge line calibration may be applied in order to mitigate NVH issues that may arise during transient conditions (such as during a tip-in, for example). More aggressive surge line calibration may include applying the delta adjustment to move the surge line to the right of a base line surge line on the compressor map the compressor map. In one example, the base line surge line may be a surge line calibrated at the threshold vehicle speed. In another example, the base line surge line may be a surge line calibrated at the first threshold engine speed. In still another example, the base line surge line may be a surge line calibrated at the second threshold engine speed.

Further, in one example, the delta adjustment may be a calibratable constant. In some examples, the delta adjustment may be based on the vehicle speed and the engine speed.

Upon calibrating the surge line based on vehicle speed and/or engine speed, method 600 may return to step 606 at FIG. 6A.

In some examples, varying degree of aggressiveness including a most aggressive calibration, a least aggressive calibration, and one or more degrees of aggressiveness in between may be implemented based on vehicle and engine speed conditions. For example, a degree of aggressiveness of the calibration may increase with decrease in a vehicle speed below a threshold vehicle speed, and the degree of aggressiveness may decrease with increase in the vehicle speed above the threshold vehicle speed. Further, a degree of aggressiveness of the calibration may increase as the engine speed decreases in the engine speed range between the first threshold engine speed and the second threshold, and the degree of aggressiveness may decrease with increase in the engine speed above the first threshold engine speed and with decrease in engine speed below the second threshold engine speed.

In this way, by utilizing less aggressive surge line calibration during high vehicle speed, high engine speed, and/or very low engine speed conditions, lost torque may be recovered and consequently, drivability may be improved. Further, by utilizing more aggressive calibration during low vehicle speed conditions and low- to mid-engine speed conditions, NVH issues may be mitigated.

Figure 7:
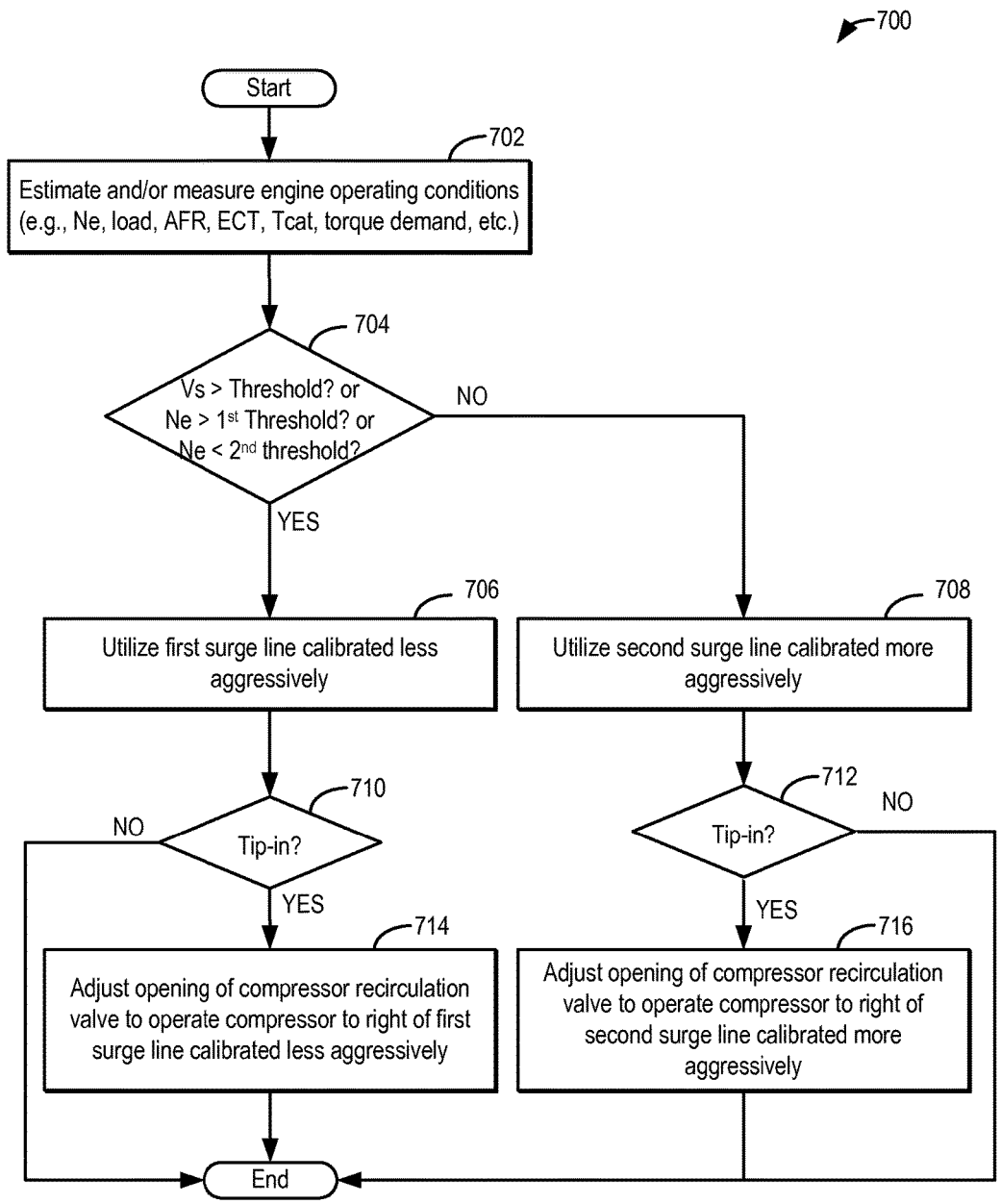
FIG. 7 shows a high level flow chart for adjusting the compressor recirculation valve during transient engine operating conditions, according to the present disclosure.
Figure 8:
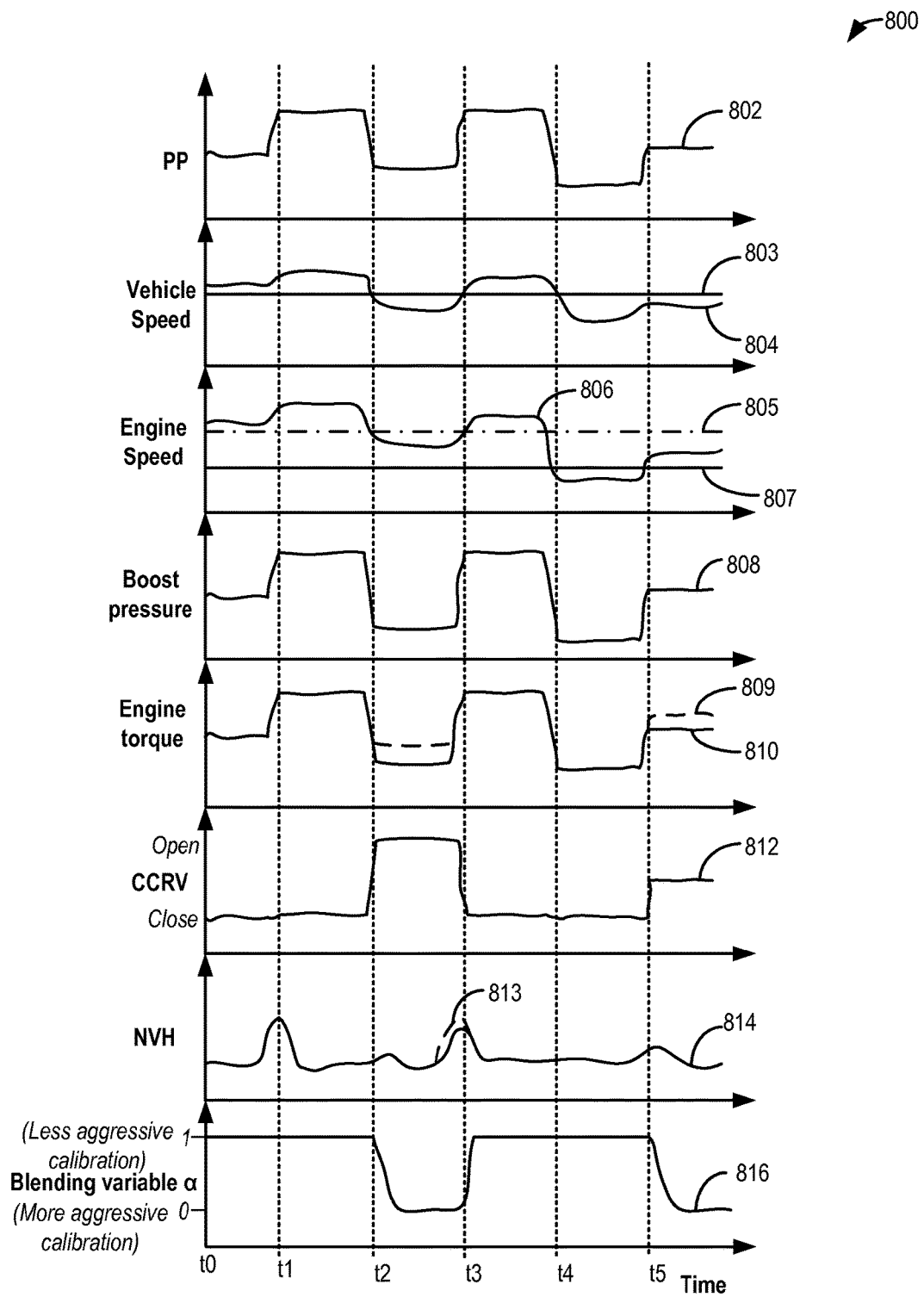
FIG. 8 shows an example sequence including surge line adjustment, engine performance, and NVH response according to the present disclosure.

FIG. 7 shows a flowchart illustrating an example method 700 for adjusting an opening of a compressor recirculation valve in response to a tip-in condition based on utilization of a less aggressively calibrated surge line or a more aggressively calibrated surge line, wherein the utilization is based on a vehicle speed and/or an engine speed. The method of FIG. 7 may be included in the system of FIG. 1 as executable instructions stored in non-transitory memory.

At 702, method 700 includes estimating and/or measuring engine operating conditions. The estimated conditions may include, for example, engine speed, vehicle speed, torque demand, boost pressure, MAP, MAF, engine temperature, combustion air-fuel ratio (AFR), exhaust catalyst temperature, ambient conditions (e.g., BP), etc.

Next, at 704, method 700 includes determining if one or more speed conditions are satisfied. The one or more speed conditions may include the vehicle speed greater than a threshold vehicle speed, the engine speed greater than a first threshold speed, and the engine speed less than a second threshold speed. If at least one of the speed conditions is satisfied, the answer at 704 is YES, and method 700 proceeds to 706. If none of the speed conditions are satisfied, the answer at 704 is NO, and method 700 proceeds to 708.

At 706, method 700 includes utilizing a first surge line calibrated less aggressively. That is, the first surge line may be utilized to determine the minimum compressor flow required for the compressor operating point to stay to the right of the first surge line.

By utilizing the first surge line calibrated less aggressively at high vehicle and/or engine speeds, priority may be given to drivability over NVH reduction as the noise associated with high engine and/or vehicle speeds may mask NVH issues (such as, tip-in whoosh noise during a tip-in). Further, less aggressively calibrated surge line may be utilized at very low engine speeds to give priority to drivability when NVH issues are below a threshold. As an example, when the first surge line that is less aggressively calibrated is utilized, it may not be required to utilize the compressor recirculation valve to recirculate flow across the compressor in order to operate the compressor to the right of the first surge line. In some examples, a small amount of compressor recirculation valve opening may be utilized to move the compressor operating point to the right of the first surge line (less aggressively calibrated) which may be less than an amount of compressor recirculation valve opening that may be required to move the compressor operating point to the right of the more aggressively calibrated surge line (that is, the second surge line). Consequently, for a given operating point, torque loss when the less aggressively calibrated surge line is utilized may be less than the torque loss when the more aggressively calibrated surge line is utilized.

At 708, method 700 includes utilizing a second surge line calibrated more aggressively. That is, the second surge line may be utilized to determine the minimum compressor flow required for the compressor operating point to stay to the right of the second surge line.

By utilizing the second surge line calibrated more aggressively, priority may be given to NVH reduction over drivability as noise associated with low engine and/or vehicle speeds may not be sufficient to mask NVH resulting from tip-in whoosh conditions. Therefore, more aggressive calibration may be used to move the compressor operating point away from the surge region into the non-surge region to reduce tip-in whoosh conditions. For example, when the second surge line that is more aggressively calibrated is utilized, compressor recirculation valve may be utilized to recirculate flow across the compressor in order to operate the compressor to the right of the more aggressively calibrated surge line. Consequently, due to increased compressor flow, required boost pressure may not be reached, and as a result, torque output may be reduced. However, by utilizing the more aggressively calibrated surge line, compressor operation may be moved away from the surge region (by increasing compressor flow, for example). As a result, tip-in whoosh noise may be reduced.

Returning to 706, upon implementing the first (less aggressively calibrated) surge line method 700 proceeds to 710. At 710, method 700 includes determining if a tip-in condition is initiated. A tip-in condition may be determined based on one or more of a change in pedal position, an increase in torque demand, etc. Upon confirming the tip-in condition, method 700 may proceed to 714. At 714, method 700 may include adjusting an opening amount of the compressor recirculation valve in order to operate the compressor to the right of the first surge line calibrated less aggressively. In other words, the compressor recirculation valve may be adjusted to operate the compressor at a higher flow rate than the first surge line. In one example, the opening amount may be zero. In another example, the opening amount may be less than an opening amount to operate the compressor to the right of the second surge line (that is, to operate the compressor at a higher flow rate than the second surge line) calibrated more aggressively.

Returning to 708, upon implementing the second (more aggressively calibrated) surge line method 700 proceeds to 712. At 712, method 700 includes determining if a tip-in condition is initiated. A tip-in condition may be determined based on one or more of a change in pedal position, an increase in torque demand, etc. Upon confirming the tip-in condition, method 700 may proceed to 716.

At 716, method 700 may include adjusting an opening of the compressor recirculation valve in order to operate the compressor to the right of the second surge line calibrated more aggressively. In other words, the compressor recirculation valve may be adjusted to operate the compressor at a higher flow rate than the second surge line. As discussed above, for a given engine operating condition, an amount of compressor recirculation valve opening utilized to move the compressor operating point to the right of the less aggressively calibrated surge line may be less than the amount of compressor recirculation valve opening utilized to move the compressor operating point to the right of the more aggressively calibrated surge line.

While the example herein illustrates adjusting the compressor recirculation valve in response to tip-in, in one example, in response to detecting a tip-out at vehicle speeds greater than the threshold vehicle speed, the compressor recirculation valve may be adjusted to operate a compressor to the right of (that is, at a higher compressor flow rate than) the less aggressively calibrated surge line, and in response to the tip-out at vehicle speeds less than the threshold, the compressor recirculation valve may be adjusted to operate the compressor to the right of (that is, at a higher compressor flow rate than) the more aggressively calibrated surge line.

In this way, the compressor recirculation valve may be adjusted based on the type of surge line (less aggressively calibrated or more aggressively calibrated) used, wherein the type of surge line utilized is based on vehicle and/or engine speed in addition to compressor pressure ratio.

In one example, the method of FIG. 7 may provide for a method for a boosted engine, comprising: in response to a tip-in at a higher vehicle speed above a threshold vehicle speed, adjusting a position of a CCRV to operate a compressor to the right of a first surge line; and in response to a tip-in at a lower vehicle speed below the threshold vehicle speed, adjusting the position of the CCRV to operate the engine compressor to the right of a second surge line; wherein, at a given compressor pressure ratio, a first compressor operating point on the second surge line has a higher compressor flow rate relative to a second compressor operating point on the first surge line.

In another example, the method of FIG. 7 may provide for a method for a boosted engine, comprising: in response to a tip-in at a higher vehicle speed above a threshold vehicle speed, adjusting a position of a CCRV to operate a compressor at a first higher compressor flow rate than a first surge line; and in response to a tip-in at a lower vehicle speed below the threshold vehicle speed, adjusting the position of the CCRV to operate the engine compressor at a second higher compressor flow rate than a second surge line;

The method may further include wherein the first surge line is calibrated less aggressively relative to vehicle speed and wherein the second surge line is calibrated more aggressively relative to vehicle speed.

The method may further include wherein in response to the tip-in at higher vehicle speed, the CCRV opening is increased by a first, smaller amount; and wherein in response to the tip-in at lower vehicle speed, the CCRV opening is increased by a second, larger amount.

The method may further comprise, in response to a tip-out at the higher vehicle speed, adjusting a position of a CCRV to operate a compressor to the right of the first surge line, and in response to a tip-out at lower vehicle speed, adjusting the position of the CCRV to operate the compressor to the right of the second surge line.

In another example, the method may further comprise in response to a tip-out at the higher vehicle speed, adjusting a position of a CCRV to operate a compressor at a third higher compressor flow rate than the first surge line, and in response to a tip-out at lower vehicle speed, adjusting the position of the CCRV to operate the compressor at a fourth higher compressor flow rate than the second surge line.

In some examples, in response to a tip-in from a lower vehicle speed below the threshold vehicle speed to a higher vehicle speed above the threshold vehicle speed, adjusting the surge line may include transitioning from a more aggressively calibrated at the lower vehicle speed to a less aggressively calibrated surge line at the higher vehicle speed. Further, in response to a tip-out from the higher vehicle speed to the lower vehicle speed, transitioning from the less aggressively calibrated surge line at the higher vehicle speed to the more aggressively calibrated surge line at the lower vehicle speed, wherein the more aggressively calibrated surge line is retarded with respect to the less aggressively calibrated surge line. In other words, the more aggressively calibrated surge line is to the right of the less aggressively calibrated surge line on the compressor map. For example, at any given compressor pressure ratio on the compressor map, a corresponding compressor flow rate on the more aggressively calibrated surge line is greater than a corresponding (to the given compressor pressure ratio) compressor pressure ratio on the less aggressively calibrated surge line.

FIG. 8 shows operating sequence 800 depicting an example surge line adjustment as a function of vehicle speed and engine speed. FIG. 8 illustrates example pedal position at plot 802, vehicle speed at plot 804, engine speed at plot 806, boost pressure at plot 808, actual engine torque at plot 810, desired engine torque at plot 809, compressor recirculation valve (CCRV) position at 812, NVH with less aggressive surge line calibration at plot 813, NVH with more aggressive surge line calibration at plot 814, and a type of surge line calibration at plot 816. The sequence of events in FIG. 8 may be provided by executing instructions in the system of FIGS. 1-2 according to the method of FIG. 6A-6B. Vertical markers at times t0-t5 represent times of interest during the sequence. In all the plots discussed below, the X axis represents time and time increases from the left side of each plot to the right side of each plot.

The first plot from the top of FIG. 8 represents accelerator pedal position versus time. The Y axis represents accelerator pedal position and a depression of the accelerator pedal increases in the direction of the Y axis arrow.

The second plot from the top of FIG. 8 represents vehicle speed versus time. The Y axis represents vehicle speed and the vehicle speed increases in the direction of Y axis arrow. Horizontal line 803 represents a threshold vehicle speed. The threshold vehicle speed may be based on one or more of a part-to-part variability of the vehicle system, and ambient conditions.

The third plot from the top of FIG. 8 represents engine speed versus time. The Y axis represents engine speed and the engine speed increases in the direction of the Y axis arrow. Horizontal line 805 represents a first threshold engine speed. Horizontal line 803 represents a second threshold engine speed. The first and the second threshold engine speed may be based on a part-to-part variability of the engine system.

The fourth plot from the top of FIG. 8 represents boost pressure versus time. The Y axis represents boost pressure and the boost pressure increases in the direction of the Y axis arrow. Horizontal line 809 represents a desired boost pressure.

The fifth plot from the top of FIG. 8 represents engine torque versus time. The Y axis represents engine torque and the engine torque increases in the direction of the Y axis arrow.

The sixth plot from the top of FIG. 8 represents compressor recirculation valve position versus time. The Y axis represents compressor recirculation valve position and a valve opening amount increases in the direction of the Y axis arrow.

The seventh plot from the top of FIG. 8 represents amount of NVH versus time. The Y axis represents amount of NVH and the amount of NVH in the direction of the Y axis arrow.

The eighth plot from the top of FIG. 8 represents blending variable α (for determining a degree of aggressiveness of surge line calibration) versus time. The Y axis represents the blending variable α and a value of the blending variable increases in the direction of Y axis arrow. Accordingly, the degree of aggressiveness decreases in the direction of Y axis arrow. Details of determining surge line calibration utilizing the blending variable is elaborated herein with respect to FIG. 5B.

At times between t0 and t1, the vehicle may be operating above the threshold vehicle speed (803) and above the first threshold engine speed (805). Consequently, the vehicle noise and road noise due to high vehicle speeds, and the engine noise due to high engine speed may mask turbo whoosh noise that may occur during transient events such as a tip-in initiated at the high vehicle and/or engine speeds. Therefore, the surge line may be calibrated less aggressively (816) in order to give priority to drivability over NVH mitigation. As a result of less aggressive surge line calibration, the compressor may be operating to the right of the less aggressively calibrated surge line. Consequently, the CCRV may be closed, a desired boost pressure may be maintained, and a desired engine torque may be available.

At time just prior to t1, a vehicle operator may depress the accelerator pedal initiating a tip-in event. During the tip-in, a tip-in whoosh noise may be generated (shown as increase in NVH (814) at t1). However, due to vehicle and road noise at high vehicle speed, and engine noise at high engine speed at the time of tip-in, the tip-in whoosh noise is masked. Further, the compressor may continue to operate to the right of the less aggressively calibrated surge line. Consequently, the CCRV may remain closed, the desired boost pressure and the desired engine torque may be available. As a result, drivability may be improved.

At time t1, and between t1 and t2, the engine speed and the vehicle speed may increase (responsive to the tip-in). Further the vehicle speed may remain above the threshold vehicle speed, and the engine speed may remain above the first threshold engine speed. Consequently, the less aggressively calibrated surge line may be utilized. In some examples, the surge line may be calibrated such that the degree of aggressiveness of calibration decreases with increase in vehicle speed and/or engine speed above the respective threshold speeds. Further, the compressor may continue to operate to the right of the less aggressively calibrated surge line. Consequently, the CCRV may remain closed allowing the boost pressure to increase to desired amount. As a result, desired torque may be provided. In this way, by utilizing less aggressive surge line calibration at high engine and vehicle speeds, priority may be given to drivability (improved torque output) over NVH mitigation as turbo whoosh noise that may occur during tip-in may be masked by external noise such as road, vehicle and/or engine noise.

At time just before t2, the vehicle operator may initiate a tip-out event by releasing the accelerator pedal. In response to the tip-out, at times t2, and between t2 and t3, the engine speed may decrease below the first threshold while staying above a second threshold. That is, the engine may operate in the low to mid speed range. Further, the vehicle speed may decrease below the threshold vehicle speed. In the low to mid-engine speed operation range, tip-in whoosh noise may increase resulting in increased NVH issues. Therefore, the surge line may be calibrated more aggressively in order to mitigate NVH issues that may arise from turbo whoosh noise (during tip-in, for example) as noise from the vehicle, road and/or engine may not be sufficient to mask the turbo whoosh noise. As such, the blending variable may be utilized to facilitate transition of switching from less aggressive calibration to more aggressive calibration (and vice versa) and thereby, avoid sudden transitions between different degrees of aggressiveness of surge line calibrations. By calibrating the surge line more aggressively, compressor operation in regions where turbo whoosh noise may be higher than a threshold (e.g. soft surge regions) may be avoided. For example, when the more aggressively calibrated surge line is utilized, the CCRV may be opened in order to avoid compressor operation to the left of the surge line. A desired CCRV flow (that is, the desired recirculation flow through the compressor recirculation valve) required to operate the compressor to the right of the surge line may be determined based on an estimated engine throttle flow, and a minimum compressor flow required to operate the compressor to the right of the surge line. As a result (of opening the CCRV), compressor flow may increase and the compressor outlet pressure may decrease, thereby moving the compressor operating point to the right of the more aggressive calibrated surge line on the compressor map. However, by opening the CCRV, boost pressure may decrease and torque output (810) may be less than desired (809). In this way, when operating in low- and mid-engine speed conditions, and low vehicle speed conditions, priority may be given to NVH mitigation over drivability by calibrating the surge line more aggressively.

At time just before t3, a second tip-in may be initiated. In response to the second tip-in, at times t3 and between t3 and t4, the vehicle speed may increase above the threshold and the engine speed may increase above the first threshold. Therefore, less aggressive calibration may be used to calibrate the surge line which may allow the compressor to be operated to the right of the less aggressively calibrated surge line without opening the CCRV. In some examples, the CCRV may be opened to a small amount which may be less than a CCRV opening amount if the more aggressive calibration is used. As a result, tip-in performance and drivability may be improved.

At time just before t4, the vehicle operator may release the accelerator pedal initiating a second tip-out event. In response to the second tip-out, at times t4 and between t4 and t5, the engine speed may decrease below the second threshold. That is, the engine may operate at very low engine speeds. Further, the vehicle speed may decrease below the threshold. At very low engine speeds (below the second threshold), NVH issues resulting from tip-in whoosh may be reduced. Consequently, priority may be given to drivability over NVH mitigation. Therefore, the surge line may be calibrated less aggressively. Further, the compressor may be operating to the right of the less aggressively calibrated surge line. Therefore, the CCRV may not be opened. As a result, desired torque may be available, and drivability at very low engine speeds may be improved.

At time just before t5, a third tip-in may be initiated by the vehicle operator. In response to the tip-in, at times t5 and beyond, the engine speed may increase above the second threshold but may remain below the first threshold. Further, the vehicle speed may increase but may remain below the threshold. Due to engine operation in the low to mid-engine speed range and vehicle speed below the threshold speed, probability of tip-in whoosh conditions may be high and engine noise and/or vehicle noise may not be sufficient to mask the NVH issues resulting from tip-in whoosh conditions. Therefore, the surge line may be calibrated more aggressively in order to mitigate the NVH issues.

In this way, by calibrating surge line not only as a function of compressor pressure ratio but also as a function of vehicle speed and/or engine speed, additional flexibility in defining the trade-off between drivability and NVH mitigation may be achieved. As a result, customer satisfaction may be achieved in a wide range of operating conditions.

In one example, the sequence of FIG. 8 may be provided by a vehicle system, comprising: an engine; a compressor for providing a boosted aircharge to the engine; a compressor recirculation valve positioned in a passage coupling an outlet of the compressor to an inlet of the compressor, wherein a position of the valve is continuously variable between a fully open and a fully closed position; a speed sensor for estimating a vehicle speed; and a controller with computer readable instructions stored in non-transitory memory for: during vehicle operation, continually adjusting a default compressor map surge line with a calibration factor based on one or both of engine speed and vehicle speed; and adjusting an opening of the compressor recirculation valve based on intake airflow to maintain compressor operation to the right of a surge limit of the adjusted surge line; wherein the default compressor map surge line is a vehicle manufacturer provided compressor map surge line determined based on green vehicle conditions.

In another example, the sequence of FIG. 8 may be provided by a vehicle system, comprising: an engine; a compressor for providing a boosted aircharge to the engine; a compressor recirculation valve positioned in a passage coupling an outlet of the compressor to an inlet of the compressor, wherein a position of the valve is continuously variable between a fully open and a fully closed position; a speed sensor for estimating a vehicle speed; and a controller with computer readable instructions stored in non-transitory memory for: during vehicle operation, continually adjusting a default compressor map surge line with a calibration factor based on one or both of engine speed and vehicle speed; and adjusting an opening of the compressor recirculation valve based on intake airflow to maintain compressor operation at a higher flow rate than a surge limit of the adjusted surge line; wherein the default compressor map surge line is a vehicle manufacturer provided compressor map surge line determined based on green vehicle conditions. and wherein the adjusting the surge line includes calibrating the surge line less aggressively at a higher vehicle speed greater than a threshold vehicle speed, and calibrating the surge line more aggressively at a lower vehicle speed less than the threshold.

The system further includes wherein the controller includes further instructions for calibrating the surge line less aggressively at an engine speed greater than a first threshold engine speed, calibrating the surge line less aggressively at the engine speed less than a second threshold engine speed, and calibrating the surge line more aggressively at the engine speed less than the first threshold and greater than the second threshold.

Still further, the system includes wherein a degree of aggressiveness of the calibration factor increases with decrease in a vehicle speed below a threshold vehicle speed, and wherein the degree of aggressiveness decreases with increase in the vehicle speed above the threshold vehicle speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine of a vehicle, comprising:
with a controller, during operation of the vehicle, determining a vehicle speed and adapting a surge line of a compressor map as a function of the vehicle speed.

2. The method of claim 1, further comprising, with the controller, determining an engine speed of the vehicle and a compressor pressure ratio of the vehicle and further adapting the surge line as a function of the engine speed and the compressor pressure ratio.

3. The method of claim 2, wherein the adapting includes, with the controller, using a first look-up table and a second look-up table in succession, inputting two of the engine speed, compressor pressure ratio, and vehicle speed into the first table and inputting an output of the first table and a remaining one of the engine speed, compressor pressure ratio, and vehicle speed into the second table, and using an output of the second table to adapt the surge line.

4. The method of claim 2, wherein the adapting includes, with the controller, determining a first more aggressive surge-line calibration as a function of the compressor pressure ratio, determining a second less aggressive surge-line calibration as a function of the compressor pressure ratio; and blending the first and the second surge-line calibrations as a weighted function of the vehicle speed and/or the engine speed.

5. The method of claim 2, wherein the adapting includes, with the controller, determining a final surge line based on a sum of a first output of a first look-up table and a second output of a second lookup table; and wherein the first table is obtained as a function of the engine speed and the compressor pressure ratio, and the second table is obtained as a function of the vehicle speed and the compressor pressure ratio.

6. The method of claim 1, wherein the adapting includes, when the vehicle speed is below a threshold vehicle speed, adapting the surge line with a more aggressive calibration, and when the vehicle speed is above the threshold vehicle speed, adapting the surge line with a less aggressive calibration.

7. The method of claim 1, wherein the controller learns the surge line adaptation over one or more vehicle drive cycles.

8. The method of claim 1, wherein adapting the surge line includes, with the controller, adapting boundaries for each of a hard surge region and a soft surge region of the compressor map, wherein the compressor map further comprises constant compressor speed lines which have a positive slope in the soft surge region.

9. The method of claim 1, further comprising, with the controller, adjusting an opening of a continuously variable compressor recirculation valve during the vehicle operation to maintain compressor operation at a higher compressor flow rate than a compressor flow rate of the adapted surge line.

10. The method of claim 9, wherein the adjusting includes, with the controller, estimating a desired throttle mass flow based on engine operating conditions; estimating a threshold compressor flow rate based on the adapted surge line; and adjusting an opening of the continuously variable compressor recirculation valve based on a difference between the desired throttle mass flow and the threshold flow rate.

11. The method of claim 1, wherein adapting the surge line as a function of the vehicle speed includes, with the controller, adapting the surge line with a more aggressive calibration during a tip-in occurring at a lower vehicle speed below a threshold vehicle speed to a higher vehicle speed above the threshold vehicle speed and adapting the surge line with a less aggressive calibration during a tip-out from the higher vehicle speed to the lower vehicle speed.

12. A method for a boosted engine, comprising:
in response to a tip-in at a higher vehicle speed above a threshold vehicle speed, adjusting a position of a continuously variable compressor recirculation valve to operate a compressor at a first higher compressor flow rate than a first surge line; and in response to a tip-in at a lower vehicle speed below the threshold vehicle speed, adjusting the position of the continuously variable compressor recirculation valve to operate the engine compressor at a second higher compressor flow rate than a second surge line;

wherein, at a given compressor pressure ratio, a first compressor operating point on the second surge line has a higher compressor flow rate relative to a second compressor operating point on the first surge line.

13. The method of claim 12, wherein at any given compressor pressure ratio on a compressor map, a compressor flow rate on the second surge line corresponding to the given compressor pressure ratio is greater than a compressor flow rate on the first surge line corresponding to the given compressor pressure ratio.

14. The method of claim 13, further comprising, in response to a tip-out at the higher vehicle speed, adjusting the position of the continuously variable compressor recirculation valve to operate a compressor at a third higher compressor flow rate than the first surge line, and in response to a tip-out at the lower vehicle speed, adjusting the position of the continuously variable compressor recirculation valve to operate the compressor at a fourth higher compressor flow rate than the second surge line.

15. The method of claim 12, wherein, in response to the tip-in at the higher vehicle speed, a continuously variable compressor recirculation valve opening is increased by a first, smaller amount; and wherein, in response to the tip-in at the lower vehicle speed, the continuously variable compressor recirculation valve opening is increased by a second, larger amount.

16. A vehicle system, comprising:
an engine;
a compressor for providing a boosted aircharge to the engine;
a compressor recirculation valve positioned in a passage coupling an outlet of the compressor to an inlet of the compressor, wherein a position of the valve is continuously variable between a fully open and a fully closed position; and
a controller with computer readable instructions stored in non-transitory memory for:
during vehicle operation, continually adjusting a default compressor map surge line with a calibration factor based on engine speed and vehicle speed; and
adjusting an opening of the compressor recirculation valve based on intake airflow to maintain compressor operation at a higher compressor flow rate than a surge limit of the adjusted surge line.

17. The system of claim 16, wherein the default compressor map surge line is a vehicle manufacturer provided compressor map surge line determined based on component bench tests.

18. The system of claim 16, wherein the adjusting the surge line includes calibrating the surge line less aggressively at a higher vehicle speed greater than a threshold vehicle speed, and calibrating the surge line more aggressively at a lower vehicle speed less than the threshold vehicle speed.

19. The system of claim 18, wherein the controller includes further instructions for calibrating the surge line less aggressively at an engine speed greater than a first threshold engine speed, calibrating the surge line less aggressively at an engine speed less than a second threshold engine speed, and calibrating the surge line more aggressively at an engine speed less than the first threshold and greater than the second threshold.

20. The system of claim 16, wherein a degree of aggressiveness of the calibration factor increases with a decrease in a vehicle speed below a threshold vehicle speed, and wherein the degree of aggressiveness decreases with an increase in the vehicle speed above the threshold vehicle speed.

* * * * *